Nov. 8, 1927.
E. MISLOWITZER
1,648,739
APPARATUS FOR MEASURING ION CONCENTRATION
Filed Nov. 7, 1925
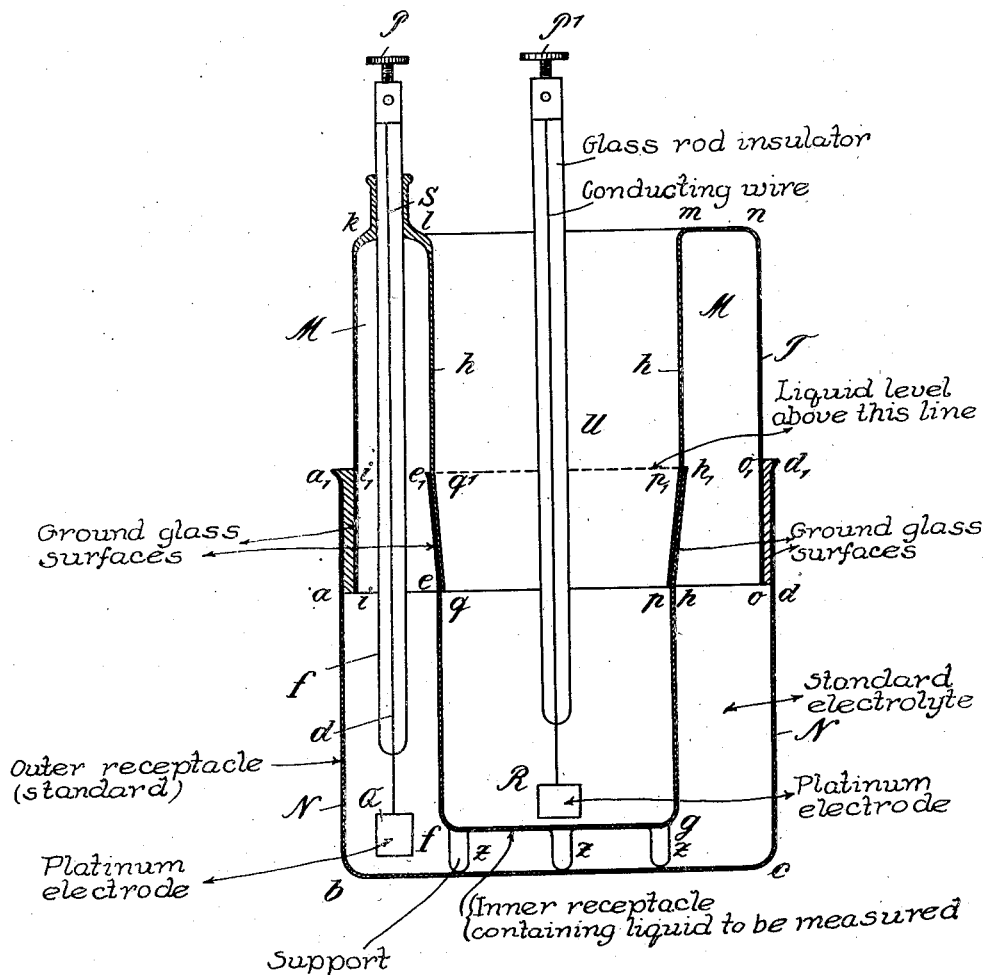

Patented Nov. 8, 1927.

1,648,739

UNITED STATES PATENT OFFICE.

ERNST MISLOWITZER, OF BERLIN, GERMANY.

APPARATUS FOR MEASURING ION CONCENTRATION.

Application filed November 7, 1925, Serial No. 67,616, and in Germany January 31, 1925.

My invention relates to an improved apparatus for measuring ion concentration comprising two electrodes in a suitable double vessel and the necessary liquids.

In apparatus of this kind, the liquid junction or connection between the liquid of the standard electrode and the liquid to be measured is effected either by means of glass tubes filled with potassium-chloride-agar or potassium-chloride solution and the like or by means of diaphragms made of porous clay, porcelain or a particularly prepared glass soaked with an aqueous solution of potassium chloride.

My invention depends upon the discovery that the capillary openings or channels between the contacting faces of ordinary ground glass bodies afford a suitable means for the above named liquids to conductively communicate with each other therethrough. In utilizing this idea, I dispense with the preparation of a suitable conducting substance and the employment of an intermediate fluid or siphons as heretofore practised, and I provide only contacting ground glass faces at a proper place in order to obtain a perfectly accurate double-electrode, which is practically free from diffusion of the liquid to be measured.

It goes without saying that instead of glass any equivalent material, such as quartz or glazed porcelain may be used for the construction of those parts of the apparatus, which are to be given the above stated ground contacting faces. When porcelain is used the conduction does not take place through that side, which is unglazed, but takes place through the interstices in the ground faces only.

Having thus set forth in general the principle upon which my invention depends, and having shown the particular improvements effected over the prior art, I shall now particularly describe a simple embodiment thereof which I have shown diagrammatically in the accompanying drawings for the purpose of more fully disclosing my invention, but which is in no way intended as a limitation upon the scope of the appended claims, as it is to be clearly understood that variations and modifications which properly fall within the scope of said claims may be resorted to when found expedient.

In the accompanying drawings forming a part of this specification and showing, for purposes of exemplification, a preferred form and manner, in which the invention may be embodied and practised, the apparatus comprises an outer vessel N and an inner vessel L, the two being in conductive connection through ground contacting surfaces $e$, $e'$, $q$, $q'$, $p$, $p'$, $h$, $h'$, the outer vessel N is filled with the liquid of a suitable standard electrode P, such as a normal or standard solution of an alkaline acetate mixed with a saturated solution of potassium-chloride in the proportion of one to one and with some quinhydrone added thereto. A small sheet of metallic platinum Q, fastened to a copper-wire $d$, is arranged to dip in the thus composed liquor. The potassium chloride entering in the capillary interstices between the contacting ground faces affords a sufficient electric conductivity between the liquor in the outer vessel N and the liquor in the inner vessel L, which is likewise given an addition of quinhydrone and in which a sheet R of platinum metal leading to the electrode P' is also arranged to dip in. The capillary fine openings in the ground glass surfaces are sufficient to produce a conductive connection or liquid junction between the liquid to be measured and the liquid of the standard electrode. While a liquid junction is established, nevertheless, diffusion of the liquids is avoided.

The apparatus as above described and shown in the drawings is shaped to form a double walled cup; in its annular outer space M the standard quinhydrone electrode is mounted, while the inner space U serves for the reception of the liquid, which is to be measured. The standard electrode P retains, upon having been filled, its constant value for a very great length of time. The platinum sheet Q of the standard electrode is attached to a copper wire $d$, encased in a glass tube $f$, which is inserted into the opening S of the top portion of the annular space M, the opening or mouth S and the tube being carefully ground to fit together, in order to provide a tight seal and at the same time allowing the tube to be readily removed, so that the tube will also serve as a plug for the opening S, serving as a means for filling in the liquid of the standard electrode P.

In the drawings the characters $a'$, $b$, $c$, $d'$ designate the lower and outer vessel N or cup having a ground annular surface $a$, $a'$, $d$, $d'$ on the inside of its rim portion. Mounted therein on three glass feet Z is the inner cup or vessel $e'$, $f$, $g$, $h'$, which also has a ground annular surface e, e', h, h' on the inner side of its rim portion. i, k, l, q, p, m, n, o designate the upper part of the apparatus including an inner cylinder q, l, m, p and an outer cylinder i, k, n, o connected at their upper ends m and n to form a closed unit in the shape of an inverted annular container with the above mentioned mouth S for the insertion of the described standard electrode P.

The upper or top portion of the apparatus has two ground annular surfaces i, i', o, o' and q, q', p, p' the former on the outer side of the rim portion of the outer cylinder i, k, n, o and the latter on the outer side of the rim portion of the inner cylinder q, l, m, p and the two vessels or cups a, b, c, d' and e', f, g, h' are shaped and dimensioned in a manner that, on placing the said top portion onto the two cups or vessels, the above described ground annular surfaces of the parts will meet in pairs and engage so, that the thus assembled parts will be in operative connection as shown in the drawings.

The portion of the apparatus designated by l, e', f, g, h', m constitutes an immersing cell, the upper half of the cell or inner cylinder q, l, m, p forming a unit including the outer cylinder T or i, k, n, o, which constitutes a kind of a ground stopper adapted to engage with the ground annular surface of the vessel or cup N.

A particular advantage of the apparatus resides in the possibility of washing and rinsing out the inner vessel or cup, refilling the same in succession with liquids to be measured and rinsing it out again after each measurement without thereby jeopardizing in any way the usefulness of the standard electrode. Thus the improved apparatus not only involves economy in space but also is simple and compact in construction, efficient and reliable in operation, easy to handle and highly practical from both the standpoint of the manufacturer and the standpoint of the user and may be manufactured at a comparatively low cost.

What I claim is:

1. An apparatus for measuring ion concentration comprising an outer vessel for the reception of a liquid, an inner vessel for the reception of a liquid, an electrode in either vessel, a ground annular surface on the inner vessel a ground annular surface on the outer vessel, a top part including an inner cylinder and a co-axial outer cylinder connected and closed at the upper end to form an annular inverted container and ground annular surfaces at the lower ends thereof adapted to engage and co-operate with the said ground annular surface at the said two vessels, substantially as and for the purpose set forth.

2. An apparatus for measuring ion concentration comprising an outer vessel for the reception of a liquid, an inner vessel for the reception of a liquid, an electrode in either vessel, a ground annular surface on the outer vessel, a ground annular surface on the inner vessel, a top part including an inner cylinder and a co-axial outer cylinder connected and closed at the upper ends to form an inverted annular container, ground annular surfaces at the lower ends of both cylinders adapted to engage and co-operate with the said annular surfaces of the said inverted annular container for the insertion of the one electrode and for filling purposes, substantially as and for the purpose set forth.

3. In an apparatus for measuring ion concentration, said apparatus having adjacent receptacles for the standard electrode and the liquid to be measured, a standard electrode in one of said receptacles, means for establishing a liquid junction between said receptacles without permitting substantial liquid diffusion, said means comprising ground glass surfaces joining the meeting faces of the adjacent receptacles, said meeting faces being beneath the liquid levels in said receptacles when the apparatus is in operation.

In testimony whereof I affix my signature.

ERNST MISLOWITZER.